(12) United States Patent
Krebill et al.

(10) Patent No.: US 8,038,024 B2
(45) Date of Patent: Oct. 18, 2011

(54) HOLDER WITH V-KNIFE BLADE FOR BI-DIRECTIONAL RUPTURE DISC ASSEMBLY

(75) Inventors: Michael D. Krebill, Lee's Summit, MO (US); Daniel G. O'Halloran, Oak Grove, MO (US); Jeromie T. Farnsworth, Independence, MO (US); Bradford T. Stilwell, Blue Springs, MO (US)

(73) Assignee: Fike Corporation, Blue Springs, MO (US)

( * ) Notice: Subject to any disclaimer, the term of this patent is extended or adjusted under 35 U.S.C. 154(b) by 573 days.

(21) Appl. No.: 11/036,232

(22) Filed: Jan. 14, 2005

(65) Prior Publication Data
US 2006/0157107 A1　Jul. 20, 2006

(51) Int. Cl.
*B65D 90/36*　(2006.01)
*F16K 17/40*　(2006.01)

(52) U.S. Cl. .................. 220/89.3; 137/68.21; 137/68.29

(58) Field of Classification Search .................. 220/89.2, 220/89.3, 277, 278; 137/38.29, 68.29, 68.24–68.26, 137/68.21, 68.19, 68.3
See application file for complete search history.

(56) References Cited

U.S. PATENT DOCUMENTS

| 2,856,096 | A | * | 10/1958 | Philip | 220/89.2 |
| 3,445,032 | A |   | 5/1969  | Raidl et al. | |
| 3,685,686 | A | * | 8/1972  | Raidl | 220/89.3 |
| 3,834,581 | A | * | 9/1974  | Solter et al. | 220/89.3 |
| 4,079,854 | A |   | 3/1978  | Shaw et al. | |
| 4,119,236 | A |   | 10/1978 | Shaw et al. | |
| 4,183,370 | A | * | 1/1980  | Adler | 137/68.23 |
| 4,342,988 | A | * | 8/1982  | Thompson et al. | 340/679 |
| 4,463,865 | A | * | 8/1984  | Mundt et al. | 220/89.3 |
| 4,580,691 | A | * | 4/1986  | Hansen | 220/89.3 |
| RE34,308  | E | * | 7/1993  | Thompson et al. | 340/679 |
| 6,321,771 | B1| * | 11/2001 | Brazier et al. | 137/68.23 |

* cited by examiner

*Primary Examiner* — Robin Hylton
(74) *Attorney, Agent, or Firm* — Hovey Williams LLP

(57) ABSTRACT

This invention relates to a cylindrical holder member for a bi-directional bulged rupture disc. The support body of the holder has a rim that supports the rupture disc with the concave surface of the disc facing the holder. The support body is provided with a unitary one-piece, centrally creased cutting element that is of generally V-shaped configuration in plan view. The cutting element has a pair of elongated converging leg components with each leg component being connected to and supported by the interior wall surface of the holder body, with each leg component having an arcuate cutting edge. The cutting edges of the leg components merge at the crease in the cutting element to define a central cutting edge peak section. The cutting element is positioned in the holder with the cutting edge peak section extending beyond the rim of the support body into the concave area of the disc. The V-shaped cutting element functions to provide for a fuller and more rapid opening of the disc upon reversal and engagement with the cutting element as compared with prior reverse buckling disc three-knife blade cutter units. The invention has especial utility in food, beverage, and pharmaceutical applications requiring sanitary pressure relief rupture disc structure.

26 Claims, 3 Drawing Sheets

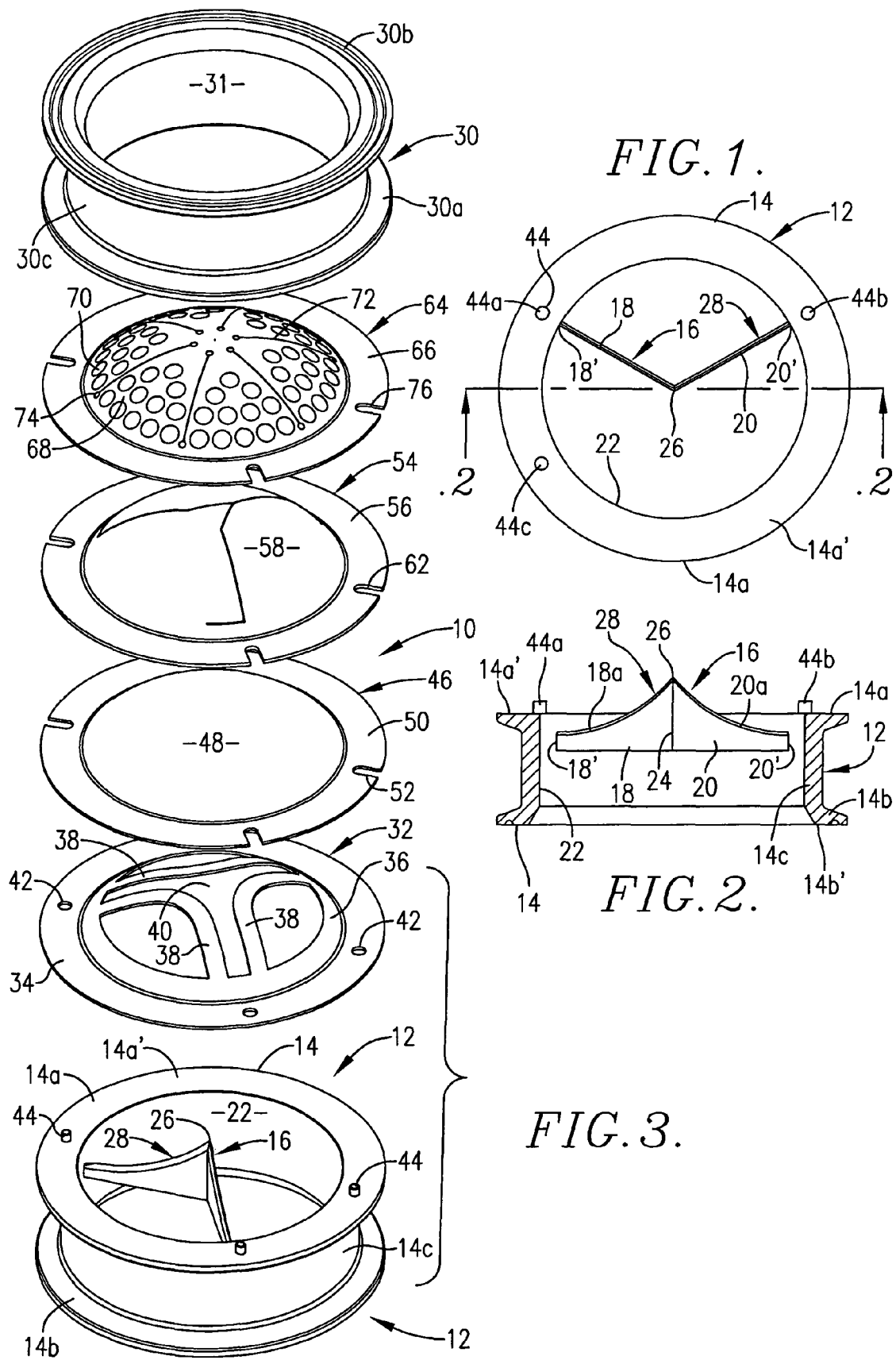

HOLDER WITH V-KNIFE BLADE FOR BI-DIRECTIONAL RUPTURE DISC ASSEMBLY

BACKGROUND OF THE INVENTION

1. Field of the Invention

The present invention relates generally to a rupture disc assembly having a bi-directional, concavo-convex rupture disc and a support body for the rupture disc that is provided with a generally V-shaped cutting element in plan view and disposed to engage and sever the disc when the disc is deflected toward the cutting element. The cutting element has a pair of leg components that are connected to the interior wall surface of the support body and that converge and join at their innermost extremities. In particular, the V-shaped cutting element is of one-piece construction with the central V-shaped cutting edge section of the cutting element defined by a unitary crease in the cutting element being positioned to extend into the concave portion of the rupture disc. The cutting edge of the cutting element includes cutting edge segments that extend along the full length of each of the leg components of the cutting element, and that are arcuate along the longitudinal length of each leg component.

The holder member for the bi-directional rupture disc having a unitary, one-piece V-shaped cutting element, which is particularly useful for sanitary processes and equipment in food, beverage, and pharmaceutical applications, meets current third-party industry approved 3A sanitary standard 60-00. The V-shaped cutting element opens a significantly greater initial area than obtained with three-blade knife structure.

2. Description of the Prior Art

There has long been a need for reliable reverse buckling rupture disc assemblies that open at predictable positive and negative pressures. This is especially true in the pharmaceutical industry where the valuable content of a process vessel must be protected from cyclic vacuum conditions that could cause contamination of the contents of the vessel, or result in an expensive shutdown of the vessel and interfere with the overall manufacturing process. Specifications for protection of processes often require that a safety device such as a rupture disc be capable of rupturing to release pressure in a vessel when the positive pressure in the vessel exceeds a predetermined protective value. That same disc, however, must also protect against relatively small negative pressure conditions imposed on the process contents and thereby the protective rupture disc. The single disc must control against dangerous overpressures, and at the same time reverse and open under minimal vacuum conditions in order to protect the process vessel and its contents.

For example, in certain applications, the process specifications require that a protective disc reverse and open fully under a vacuum condition as little as one inch of water imposed on the convex face of the disc. At the same time that disc must be capable of resisting rupture at a relatively high positive pressure on the concave face of the disc.

In order to assure full opening of a disc under a specified vacuum, it has been the practice to provide a holder for the disc which includes a knife blade located on the concave side of the disc so that upon reversal of the disc in response to a vacuum condition, the disc is severed by the knife and desirably opens fully. A number of different knife blade configurations for assuring opening of a concavo-convex disc have been proposed, with some achieving substantial commercial acceptance. One such knife blade design is shown and described in U.S. Pat. No. 4,119,236 of Oct. 10, 1978. In the '236 patent, the cutting member is in the form of a triangular knife having radially extending knife blade sections that terminate in a central knife blade edge. The angle between adjacent knife blade sections is the same, i.e., 60°.

Because the knife of the '236 patent is made up of three separate angularly disposed knives, the knives must be welded at their zones of joinder. This means that there is a residual weld fillet along the width of each of the adjacent knife blades. These weld fillets are believed to be in part responsible for what is deemed to be the unacceptable failure rates of discs to open upon reversal and engagement with the tri-knife cutting member. Rupture discs used with tri-knife blades of the '236 patent type that are designed for use in sanitary food and pharmaceutical production facilities generally employ a relatively thin, flexible rupture disc of Teflon® or the like as a barrier disc. Teflon is a tough synthetic resin material that can resist timely and required extent of severing if a significant area of the disc is not immediately cut accompanied by a rapid rate of propagation of the sever lines.

SUMMARY OF THE INVENTION

The present invention relates to a rupture disc holder member especially useful for sanitary applications and that provides for more reliable and consistent severing and fuller opening of a bi-directional rupture disc and especially at lower pressures when the disc reverses under a vacuum condition and is deflected against a disc cutting element mounted in the holder, than prior holders employing a welded three-blade configuration. A generally V-shaped cutting element for the disc is mounted in the disc holder and has a pair of elongated leg components connected to and supported by the interior wall surface of the holder. The leg components extend inwardly from the holder member wall surface, converge toward one another, and join at their innermost extremities. The V-shaped cutting element is of one-piece construction, thereby eliminating the problems associated with required welding of adjacent tri-knife blades. The innermost extremities of the leg components define a cutting edge located to engage and sever the disc when the disc is deflected and reverses, even under a relatively low-level vacuum condition.

The leg components of the cutting element are located in a position defining an angle therebetween of approximately 120°. This widely spread leg arrangement of the leg components of the cutting element assures that the separate segments of the Teflon bi-directional rupture disc, upon severing, pass cleanly through the two areas on opposite sides of the cutting element without a tendency to hang up on the cutting element, especially at the joinder area of the converging leg segments of the cutting element.

Comparative tests have demonstrated that the V-shaped, one-piece cutting element of the present invention provides an initial moon-shaped opening area in a Teflon disc that is more than 500% greater than the initial triangular opening area in a Teflon disc using a conventional three-blade knife.

BRIEF DESCRIPTION OF THE DRAWING FIGURES

A preferred embodiment of the present invention is described in detail below with reference to the attached drawing figures, wherein:

FIG. 1 is a plan view of the holder member for a bi-directional rupture disc embodying the preferred concepts of the present invention;

FIG. 2 is a cross-sectional view taken substantially on the line 2-2 of FIG. 1 and looking in the direction of the arrows;

FIG. 3 is an exploded, three-dimensional depiction of a pressure relief assembly, which includes a bi-directional rupture disc and that incorporates the holder member shown in FIG. 1;

DETAILED DESCRIPTION OF THE PREFERRED EMBODIMENT

Figure 4:
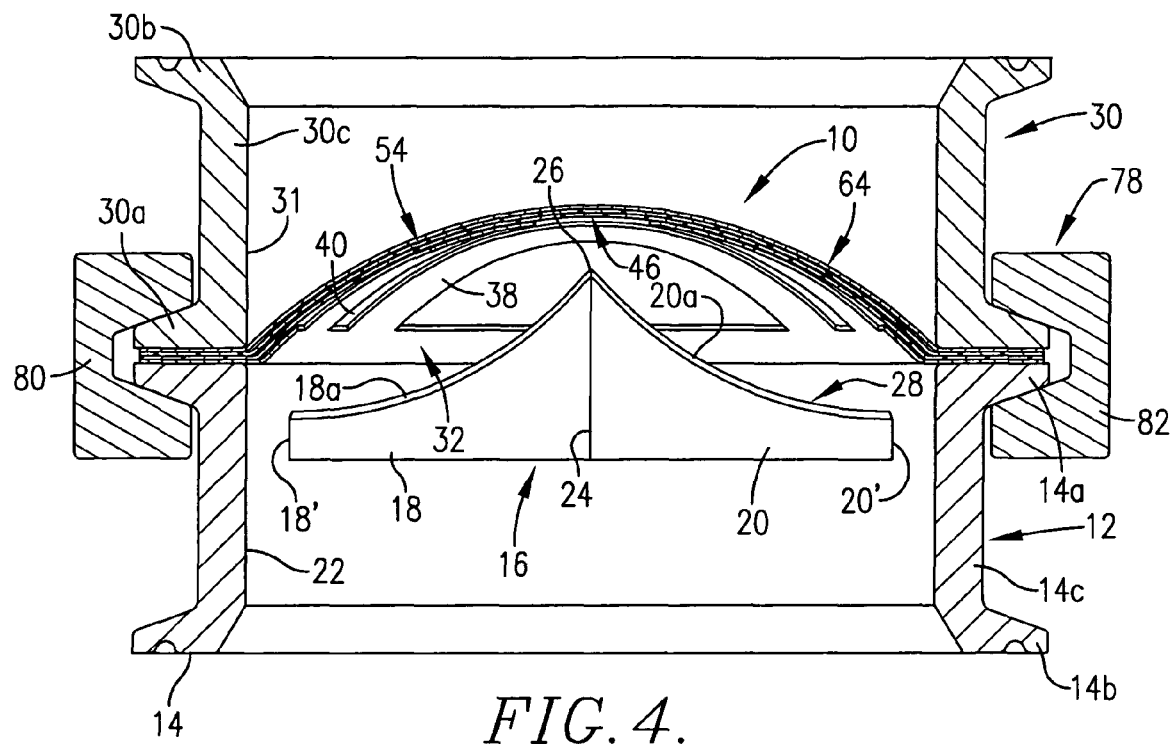
FIG. 4 is an enlarged vertical cross-sectional view of the assembled components shown in the exploded view of FIG. 3.

A pressure relief assembly 10 as shown in FIG. 4 is made up of the components more specifically illustrated in exploded view FIG. 3. Assembly 10 includes a holder member 12 that, for example, may comprise a holder support body 14 having a pair of spaced circular flange segments 14a and 14b separated by a unitary, generally cylindrical central hub section 14c. It can be seen from FIGS. 2 and 4 that the flange segments 14a and 14b are of greater diameter than the hub section 14c. A V-shaped cutting element 16 is provided within the cylindrical interior of holder support body 14. The terminology V-shaped cutting element 16 as used herein means that the cutting element is of V-shaped configuration in plan view.

Holder 12 comprises no more than one V-shaped cutting element 16 having no more than two elongated leg components 18 and 20 with the outermost margins 18' and 20' of components 18 and 20 being rigidly affixed to the inner cylindrical wall surface 22 of holder member 12 below the annular margin 14a' of flange segment 14a. As shown in FIGS. 2 and 4, the cutting element 16 is located in somewhat closer spaced relationship to margin 14a' of flange segment 14a of holder member 12 than to the circular margin 14b' of flange segment 14b of holder member 12.

The cutting element 16 is of one piece unitary construction and has a unitary crease 24 midway between the outermost margins 18' and 20' of leg components 18 and 20 that defines the apex peak 26 of the cutting element 16. The leg components 18 and 20 of cutting element 16 extend radially from the cylindrical wall surface 22 and are at an angle relative to one another that defines an interior angle less than 180°. Preferably, the interior angle between leg components 18 and 20 is about 120° as depicted in FIG. 1.

The cutting element 16 has a relatively sharp cutting edge 28 that extends the full length of the leg components 18 and 20. The cutting edge 28 may be defined by either an edge that is V-shaped in cross section, or a transversely inclined single plane edge surface. It can be seen from FIGS. 2-4 that the cutting edge 28 is made up of respective arcuate edge segments 18a and 20a that extend the full length of corresponding leg components 18 and 20 and that merge at the apex peak 26 of the cutting edge 28.

The apex peak 26 of the cutting edge 28 defined by the merger of unitary leg components 18 and 20 is preferably located near or at the center point of the cylindrical wall surface 22 of holder member 12. The cutting element 16 and holder member 12 are preferably both constructed corrosion-resistant material such as stainless steel in order for the pressure relief assembly 10 to comply with 3A sanitary use specifications.

The pressure relief assembly 10 includes an upper rupture disc clamping member 30 that has circular flange segments 30a and 30b respectively joined by a central cylindrical hub section 30c. The cylindrical interior wall surface 32 of hub section 30c is preferably of the same diameter as wall surface 22 of holder member 12.

A reverse buckling control spider disc 32 is adapted to be mounted on the flange margin 14a' of holder member 12 in partial closing relationship to the interior opening defined by the flange segment 14a of holder member 12. The control spider disc 32 is a dome-shaped vacuum support that has a circumscribing flange portion 34 that is unitary with the domed central spider section 36. The curved leg segments 38 of domed central spider section 36 define a Y-shaped opening 40 therebetween configured and arranged such that the cutting edge 28 of cutting element 16 is aligned with the Y-shaped opening 40. The flange 34 of spider disc 32 is provided with a series of circumferentially spaced apertures 42 strategically located in this position to removably receive respective alignment posts 44 extending upwardly from the flange margin 14a' of holder member 12. The control spider disc 32 may be fabricated of Teflon having a thickness of from about 0.030 to about 0.090 in., or fabricated of stainless steel sheet material having a thickness of from about 0.004 to about 0.016 in.

The curved leg segments 38 of domed central spider section 36 engage and support a relatively thin flexible rupture disc 46 that overlies holder member 12. Disc 46 is preferably fabricated of a flexible synthetic resin material such as Teflon of a nominal thickness of about 0.002 to about 0.010 in. The central section 48 of disc 46 is of concavo-convex configuration presenting a central dome that complementally engages the adjacent curved surfaces of central spider section 36 of control spider disc 32. The annular flange portion 50 of disc 46 has slots 52 located to be aligned with the post 44 of holder member 12.

A second Teflon disc 54 having a flange 56 and a central domed section 58 overlies disc 46 in complemental relationship thereto. The domed section 58 of disc 54 has irregularly shaped slits 60 configured to directly overlie the Y-shaped opening 40 defined by curved leg segments 38 of control spider disc 32. The flange 56 of disc 54 has slits 62 that align with slits 52 in disc 46 and openings 42 in spider support disc 32 for reception of the alignment posts 44. The disc 54 preferably is of material having a thickness of about 0.002 to about 0.010 in.

An apertured forward-acting rupture disc 64 rests against convex face of disc 54. Disc 64 has peripheral flange 66 joined to a central bulge section 68 provided with a number of equal diameter openings 70 therein. A series of radially disposed slits 72 in the bulge section 68 terminate at respective posed end openings 74. It can be seen from FIG. 3, for example, that the innermost end openings 74 of slits 72 are located in spaced relationship from one another at the uppermost portion of the dome. Flange 66 of disc 64 has slits 76 that also align with slits 62, slits 52, and openings 42 to maintain the disc 64 aligned with the remainder of the assembled discs.

The upper member 30 rests against disc 64 with flange 30a engaging flange 66 of disc 64. It can be seen from FIG. 4, that the cutting element 16 of holder member 12 extends into the cavity defined by the assembled components comprising spider disc 32, rupture disc 46, Teflon disc 54 and forward-acting rupture disc 64. However, the apex peak 26 of cutting element 16 is spaced from the adjacent leg segments 38 of control spider disc 32. In addition, the apex peak 26 is located substantially at the center of the domed sections of the assembled discs 32, 46, 54, and 64.

As is best seen in FIGS. 1 and 3, two posts 44a and 44b are provided in general alignment with leg components 18 and 20 of cutting element 16, while a third post 44c is provided offset from one of the posts 44a and 44b. The provision of three posts 44a, 44b, and 44c, strategically positioned as illustrated, assures that the spider buckle disc is maintained in proper alignment with the cutting element 16, and at the same time maintaining the other disc elements of the assembly in proper alignment.

A conventional, two-section toggle clamp 78 is preferably used to join holder members 12 and 30 and clamp discs 32, 46, 54, and 64 therebetween. The clamp 78 has opposed U-shaped segments 80 and 82 that overlie the flange 30a of holder member 30 and flange 14a of holder member 12.

In operation, when the pressure relief assembly 10 is positioned in a line leading from a pressure vessel, or in a process line under pressure, the forward-acting disc 64 in association with the imperforate rupture disc 46 prevents flow of fluid in a direction toward disc 64. However, if the fluid pressure against the concave face of rupture disc 46 as constrained by forward-acting disc 64 exceeds the combined resistance to rupture of the two discs, the domed section 68 of forward-acting disc 64 gives way along slits 72 allowing the domed portion 48 of rupture disc 46 to rupture thereby relieving the pressure. Forward-acting rupture disc 64 is nonfragmenting because the petal portions of dome 68 between adjacent slits 72 open but do not separate from the disc adjacent the flange 66.

When the pressure relief assembly 10 experiences a negative pressure resulting from a vacuum condition in the protected vessel or line that causes the domed section 48 of rupture disc 46 to reverse against the resistance of support leg segments 38 of control spider disc 32, the leg segments reflect toward holder member 12 allowing the deflected section 48 of disc 46 to first engage the apex peak 26 of cutting element 46. As the central section 48 of rupture 46 continues deflection under the negative pressure, the cutting edge 16 of holder member 12 severs the section 48 along a V-shaped line defined by the leg components 18 and 20 of cutting element 16 thus resulting in full opening of the rupture disc 46.

Figure 5:
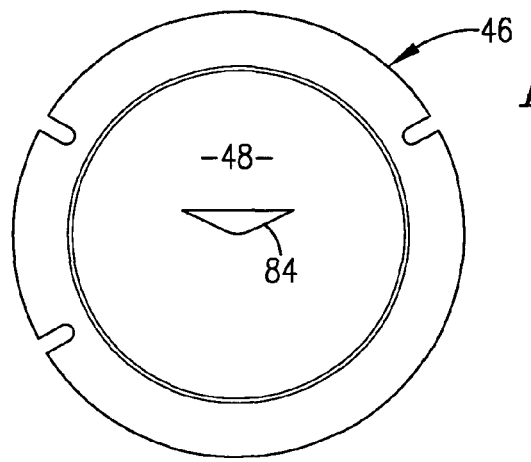
FIG. 5 is a schematic representation of the bi-directional rupture disc and illustrating the area of the disc initially opened by the V-shaped blade structure of the holder member.

As shown in FIG. 5, upon contact of the central section 48 of disc 46 undergoing reverse buckling with the apex peak 26 of cutting element 16, a half-moon shaped opening 84 is formed in section 48 of the rupture disc 46. The opening 84 continues to enlarge as the arcuate cutting edge segments of cutting element 16 engage and sever the Teflon material of disc 46.

Figure 6:
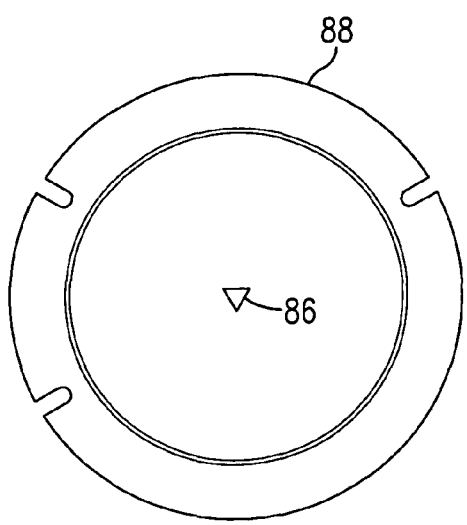
FIG. 6 is a schematic representation of a bi-directional rupture disc and showing the area of the disc initially opened by conventional three blade knife structure.

FIG. 6 is a schematic representation of initial severing and opening of a rupture disc of the prior art in which the cutting element consisted of three radially positioned blades as shown and described in the '236 patent. In this instance, the small triangular area 86 of the test disc 88 initially opened by engagement of the disc with the pointed peak of the three blades is significantly smaller than the half-moon area 82 opened in disc 46. Tests have demonstrated that there is a more than 500% increase in the half-moon shaped opening area when using the V-blade design of the present invention as compared with the small triangular initial opening formed by conventional three-blade structure as shown and described in the '236 patent.

Figure 7:
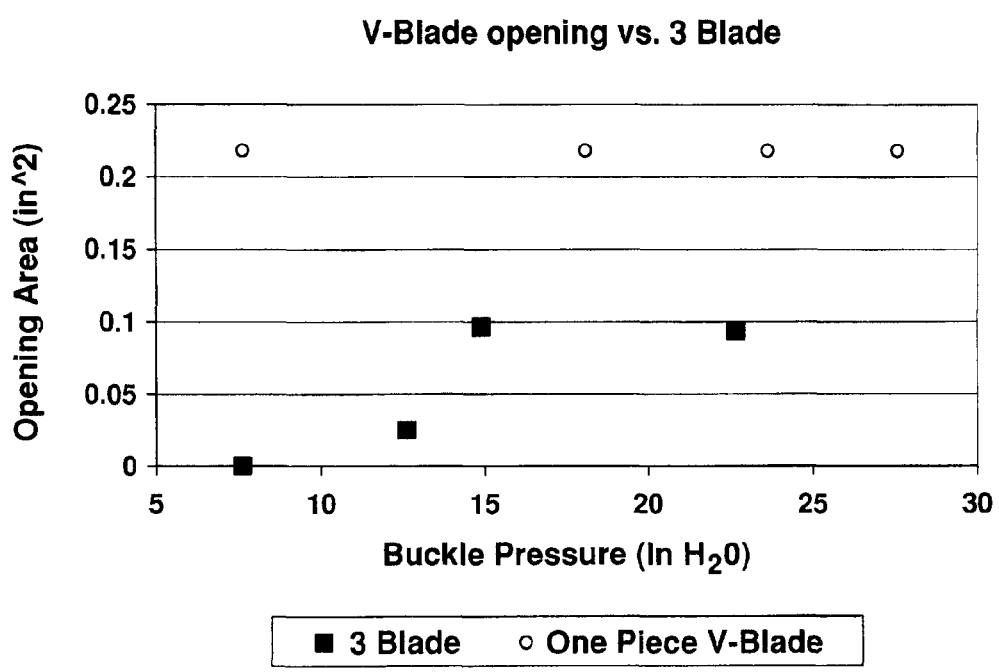
FIG. 7 is a chart illustrating test results comparing the opening of a rupture disc with the V-shaped cutting element of the present invention as compared with severing of a rupture disc with a conventional three-blade unit.

Test results comparing opening a rupture disc with the V-shaped cutting element of the present invention as compared with severing of a rupture disc with a conventional three-blade unit are set forth in FIG. 7. It is desirable that the point of the knife blade that first engages the rupture disc upon reversal be extremely sharp in order to effect immediate severing and opening of the disc material. However, because the weld fillets that join adjacent edges of the blades of a three-blade unit fill the crevices between adjacent blades, these filler fillets prevent the disc engaging point of the blades from being as sharp as desired, thus retarding initiation of the opening of the disc.

Tests verify that the V-shaped cutting element of the present invention provides an improved opening area, especially seen in the lower pressure applications of the pressure relief assembly 10. Because the force generated during reversal of the leg segments 38 of the control spider device 32 is substantially constant regardless of the blade configuration, i.e., V-shaped or three separate, triangularly positioned blades, the two sharp leg components 18 and 20 of V-shaped cutting element 16 provide an increased pressure on each knife edge when compared to a three-blade configuration. The welded three-blade design as shown for example in the '236 patent, relies on even alignment of three points to create a single sharp cutting region. Irregular gaps between the blades can cause inconsistent openings. The folded one blade design of this invention provides a better transition from the apex peak 26 along cutting segment edges of leg segments 18 and 20 assisting in creating smooth transitions between the two cutting lines and longer cuts in the seal.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A holder member for a bi-directional rupture disc and comprising:
   a support body for the rupture disc, said support body having an internal wall surface; and
   no more than one cutting element for the disc having no more than two elongated leg components, said cutting element being of one-piece unitary construction and substantially V-shaped in plan view,
   each of said leg components being connected to and supported by the wall surface,
   said leg components extending inwardly from the wall surface, converging toward one another, and joined by a unitary crease at their innermost extremities,
   the innermost extremities of the leg components defining an apex peak at the unitary crease and a cutting edge located in disposition to engage and sever the disc when the disc is deflected toward the cutting element.

2. A holder member as set forth in claim 1, wherein the leg components of the cutting element are located in a position defining an angle therebetween of less than 180°.

3. A holder member as set forth in claim 1, wherein the leg components of the cutting element are located in a position defining an angle therebetween of approximately 120°.

4. A holder member as set forth in claim 1, wherein the cutting edge of the cutting element is located in disposition to first engage the disc upon deflection of the disc toward the cutting element.

5. A holder member as set forth in claim 4, wherein adjacent cutting edge portions of the leg components cooperate to present a central peak section at the innermost extremities of the leg components.

6. A holder member as set forth in claim 5, wherein the cutting edge of the central peak section has converging generally arcuate edge segments.

7. A holder member as set forth in claim 5, wherein said support body has a circumscribing rim for receiving a flange portion of the disc, and the central peak section of the cutting edge extends outside of the wall surface of the support body beyond the rim of the support body.

8. A holder member as set forth in claim 7, wherein said support body is of generally cylindrical configuration.

9. A holder member as set forth in claim 8, wherein the support body has an internal wall surface defining a central area and the peak section of the cutting element has an apex portion located substantially at the center of the central area of the wall surface.

10. A holder member as set forth in claim 1, wherein the cutting edge of the cutting element is substantially V-shaped.

11. A holder member as set forth in claim 10 wherein said cutting element is provided with a transverse crease defining the apex of the V-shaped cutting element.

12. A holder member as set forth in claim 1, wherein the cutting edge of the cutting element extends substantially the full length of each of the leg components.

13. A holder member as set forth in claim 12, wherein the cutting edge of the cutting element is longitudinally arcuate throughout the length of respective leg components.

14. A holder member as set forth in claim 1, wherein said support body has a circumscribing rim for receiving a flange portion of the disc, and disc-engaging alignment structure being provided on the rim requiring the disc to be positioned on the holder member in a predetermined position with respect to the cutting element.

15. A holder member as set forth in claim 14, wherein said alignment structure includes a plurality of projections upstanding from the rim for receipt in apertures therefor in the disc.

16. A holder member as set forth in claim 15, wherein said projections are provided on the rim of the holder member in general alignment with the areas of joinder of the leg components to the wall surface of the holder member.

17. A holder member as set forth in claim 16, wherein is provided at least one other projection on the rim of the holder member other than the projections aligned with the leg components.

18. A holder member as set forth in claim 15, wherein said projections are pins extending upwardly from the rim of the holder member.

19. A pressure relief assembly comprising:
a concavo-convex bi-directional rupture disc;
a support body having an internal wall surface and a rim portion in circumscribing relationship to the wall surface,
said rupture disc being mounted on the rim portion of the support body with the concave face thereof facing the internal wall surface of the support body; and
no more than one cutting element for the disc having no more than two elongated leg components, said cutting element being of one-piece, unitary construction and substantially V-shaped in plan view,
each of said leg components being connected to and supported by the wall surface,
said leg components extending inwardly from the wall surface, converging toward one another, and joined by a unitary crease at their innermost extremities,
the innermost extremities of the leg components defining an apex peak at the unitary crease and a cutting edge located in disposition to first engage the concave face of the rupture disc and to sever the disc when the disc is deflected toward the cutting edge of the cutting element.

20. A pressure relief assembly as set forth in claim 19, wherein the cutting edge of the cutting element extends above the rim of the support body into the concave portion of the disc.

21. A pressure relief assembly as set forth in claim 20, wherein the cutting edge of the cutting element is of a generally V-shaped configuration.

22. A pressure relief assembly as set forth in claim 21, wherein said cutting element is provided with a transverse crease defining the apex of the V-shaped cutting element.

23. A pressure relief assembly as set forth in claim 20, wherein the cutting edge of the leg portions of the cutting element define a peak section that extends into the area of the disc defined by the concave face thereof.

24. A pressure relief assembly as set forth in claim 19, wherein the leg components of the cutting element are located in a position defining an angle therebetween of less than 180°.

25. A pressure relief assembly as set forth in claim 19, wherein the leg components of the cutting element are located in a position defining an angle therebetween of approximately 120°.

26. A pressure relief assembly as set forth in claim 19, wherein is provided a dome-shaped vacuum support between the disc and the cutting element, said vacuum support having unitary bar portions aligned with corresponding leg components of the cutting element.

* * * * *